Patented Sept. 12, 1933

1,926,056

UNITED STATES PATENT OFFICE 1,926,056

METHOD FOR PRODUCING VINYL DERIVATIVES OF ACETYLENE

Julius A. Nieuwland, Notre Dame, Ind., assignor to E. I. du Pont de Nemours & Company, Wilmington, Del., a corporation of Delaware No Drawing. Application December 29, 1930
Serial No. 505,463

17 Claims. (Cl. 260—170)

This invention relates to improvements in the process for polymerizing acetylene. More particularly, it relates to improvements in the catalyst used to polymerize acetylene to highly unsaturated, nonbenzenoid hydrocarbons.

In an application of Julius A. Nieuwland, Serial Number 153,210, filed December 7, 1926, has been described a process for carrying out the polymerization of acetylene in the presence of a suitable copper salt solution to form unsaturated, nonbenzenoid hydrocarbons such as vinylacetylene, divinylacetylene, $C_8H_8$, etc. In this process the acetylene is polymerized when introduced into a catalyst comprising a substantially saturated aqueous solution of a cuprous compound, such as cuprous chloride, finely divided copper, and a nitrogen base such as ammonium chloride.

In an application of Calcott and Downing, Serial Number 303,494, filed September 1, 1928, is disclosed a method for the continuous production of acetylene polymers by the use of the catalyst discovered by Nieuwland. In the latter application, acetylene is introduced continuously into the heated catalyst, the resulting polymers are continuously removed together with the unreacted acetylene, the entrained acetylene then separated and reintroduced into the catalyst.

The product resulting from polymerizing acetylene as disclosed in these prior applications is a mixture of higher hydrocarbons of the acetylene series containing divinylacetylene, together with hydrocarbons having the molecular formula $C_4H_4$ and $C_8H_8$. Monovinylacetylene has been definitely identified as a constituent of the compounds having the formula $C_4H_4$. These products may be separated by distillation.

The present invention has as an object the modification of the catalyst disclosed in these prior applications to make possible the production of higher yields of the acetylene polymers per unit weight of catalyst. A further object is the production of a catalyst having a longer serviceable life.

With these objects in view, it has been discovered that if an inorganic acid is added in proper proportions to the catalyst comprising a cuprous salt, finely divided copper and an ammonium salt or tertiary amine salt, the life of the catalyst and the production will be largely increased without the production of vinyl chloride or other secondary addition products in substantial quantities.

The operation is carried out with the modified catalyst in the same manner as described in the above identified applications, as will appear from the examples following. It may, of course, be carried out by the continuous method.

Example I

A mixture is prepared containing 70 parts of cuprous chloride, 27 parts of ammonium chloride, 7 parts of finely divided copper powder, 30 parts of water and 2.1 parts of commercial hydrochloric acid (37%). This mixture is agitated thoroughly while passing into it acetylene gas. Rapid absorption of the gas takes place and the temperature may rise as high as 50° C. during the course of the reaction without causing trouble, but it is preferable to hold it down to about 25° C. by suitable cooling. When the absorption indicates that the reaction has slowed up, the operation is discontinued, the mass allowed to stand for 24 hours or more and the highly unsaturated hydrocarbon formed is obtained by distilling. The distillation is stopped when the hydrocarbon condensed is mixed with much water. The water is separated and returned to the reaction mass which, after cooling and addition of hydrochloric acid equivalent to the chlorine in the hydrocarbon produced, is ready for the absorption of more acetylene. This cycle of operation can be repeated indefinitely and a given lot of copper may be thus used for the conversion of an indefinite amount of acetylene. Purification of the constituents of this product may be accomplished by fractional distillation; thus one obtains vinylacetylene in a fraction collected from 0 to 10° C.; divinylacetylene in the fraction boiling between 80 and 90° C. and higher nonbenzenoid polymers of acetylene, including a tetramer, $C_8H_8$, boiling at higher temperatures. The latter should be removed in vacuo.

Due to the presence of the acid, the life of the catalyst composition is more than ten times as great as that of the previous Nieuwland case.

Example II

The above catalyst is prepared as described in Example I, but substituting an equivalent weight of commercial 40% hydrobromic acid. The reaction, though less rapid than Example I, takes place in essentially the same manner, producing the same product.

Example III 1,000 g. of cuprous chloride, 25 cc. of commercial 37% hydrochloric acid, 50 g. of copper powder and 326 g. of ammonium chloride are thoroughly mixed with 450 g. of distilled water and the mixture placed in a closed vessel. This mixture is stirred and heated to 55° C. Pure acetylene is then passed into and through the heated mixture. The emerging gases are led to a condenser. The water and oily products in the gases are condensed and the water is returned to the catalyst while the oily products are collected. The unreacted acetylene is mixed with the fresh acetylene passing into the mixture. When the gas circulation rate is held slightly above the point necessary to cause the reaction of 8 to 9 liters of acetylene per hour, there will be produced, as soon as all cupric copper is reduced, (4 to 8 hours operation) a quantitative yield of unsaturated oily products. In order to maintain the proportion of hydrochloric acid small quantities of the same must be added at frequent intervals in order to replace that which is lost as chlorine in the product.

It will be understood that the conditions set forth in the above examples need not be adhered to rigidly. Thus, the proportions of the catalyst mass may be widely varied. Air may or may not be present. It is best to operate the batch process below 50° C., but in the continuous process, while the preferred range lies between 45° or 50° and 60° C., temperatures as high as 100° C. may be employed.

The preferred catalyst exclusive of the acid may be defined as a substantially saturated aqueous solution of a cuprous salt, finely divided copper and an ammonium or tertiary amine salt.

The presence of the copper powder is not essential. Its function is merely to insure that all of the combined copper is present in the cuprous form as cupric copper causes undesirable side reactions. Cuprous salts such as chloride, bromide, iodide and cyanide may be employed; a mixture of cupric salt and a reducing agent may be substituted for the cuprous salt, but it is best to have all of the copper salt reduced before starting.

In place of the ammonium or amine salt, free ammonia or amine may be added, or any tertiary nitrogen base adapted to be neutralized and converted to a salt by the acid present as a feature of this invention. The following salts and nitrogen bases are among those which may be used for this purpose; ammonium chloride, ammonium bromide, tertiary amines such as pyridine and the acetates, formates, hydrochlorides and hydrobromides of pyridine, quinoline, diethylmetanilic acid, dimethylaniline, diethylaniline, quinaldine, etc. For the purpose of this invention pyridine is the preferred tertiary amine and a tertiary amine is defined as an amine compound in which the nitrogen is connected to two or three carbon atoms through three bonds.

It is not necessary that the amine constituent as originally added be a salt of the same acid as that which exists in the catalyst or that which forms the anion of the copper salt. Thus, pyridine formate may be used in a catalyst containing cuprous bromide and free hydrochloric acid, three different anions therefore being present. It is desirable, for optima results, that the amount of ammonium or amine salt be sufficient to effect substantially complete saturation of the liquid phase and that the cuprous salt be more than sufficient for complete saturation. These conditions, however, are not essential.

For the acid constituent which is the feature of this invention, any inorganic acid may be used which does not form a cuprous salt which is insoluble in a saturated aqueous solution of the desired amine or ammonium salt to be used in the catalyst, and which has an ionization constant of $10^{-6}$ or greater. Mixtures of acids may be employed if desired. Such acids as the following can, for example, be used: hydrochloric, hydrobromic, hydriodic, sulfuric, phosphoric, etc. The acid should be added to the catalyst in sufficient quantity to form the salt with any free nitrogenous base present and in sufficient excess to establish an hydrogen ion concentration of greater than pH 6, and preferably not in excess of that quantity equivalent to any free amine which may be present plus a sufficient quantity of acid to furnish ionizable hydrogen equal to 0.2% of the weight of the cuprous copper in the system. Thus, if a catalyst be made containing 45 parts of cuprous copper (as 70 parts cuprous chloride), and the proper amount of water, copper powder and ammonium chloride, acid may be added to furnish not over 0.09 parts of ionizable hydrogen since there is no free amine in the system. The 0.09 parts of ionizable hydrogen might be furnished by 8.88 parts of commercial 37% hydrochloric acid, for example.

In some cases (Example III) particularly in the continuous process, small quantities of acid are lost from the catalyst with the acetylene polymer. Thus, in the use of the hydrochloric acid catalyst, acid losses are due to volatilization and through the formation of small quantities of chlorine containing products. The acid which leaves the catalyst must be determined and continuously replaced for best results.

The method of carrying out the absorption described may also be varied to a large extent. The acetylene may be introduced into the absorption mixture under pressure, and the pressure may be maintained upon such mixture for a suitable length of time to permit complete absorption and reaction. If desired, the reaction mixture may be kept at elevated temperatures to assist in carrying out the desired reactions.

Monovinylacetylene, one of the final products, was first discovered by Willstatter and Wirth (Ber. 46, 535), by exhaustive methylation of 1,4-tetramethyldiaminobutene-2.

Formula: $C_4H_4$
Structure: $CH_2=CH-C\equiv CH$
Boiling range: Apparently 4-8° C.

It forms a yellow salt with ammoniacal cuprous chloride; a white slightly soluble salt with silver nitrate and numerous complex addition compounds with solutions of salts of cuprous copper.

As many apparent and widely different embodiments of this invention may be made without departing from the spirit thereof, it is to be understood that I do not limit myself to the foregoing examples or descriptions except as indicated in the following claims.

I claim:

1. The method of producing from acetylene hydrocarbons of higher molecular weight which comprises bringing the acetylene into contact with an aqueous catalyst mixture prepared from a cuprous salt, an ammonium compound of the class consisting of ammonium salts and tertiary amines and an amount of an inorganic acid (having an ionization constant of at least $10^{-6}$) in such excess of that amount equivalent to the base present as to establish a hydrogen ion concentration of at least pH 6 but not in such excess of said equivalent amount as to establish ionizable hydrogen over 0.2% of the weight of cuprous copper in the system, said acid being adapted to form a cuprous salt which is soluble in the mixture.

2. The method of producing from acetylene hydrocarbons of higher molecular weight which comprises bringing the acetylene into contact with an aqueous catalyst at a temperature not in excess of 100° C. comprising a cuprous salt, a compound of the class consisting of salts of ammonia and tertiary amines, and an amount of an inorganic acid (having an ionization constant of at least $10^{-6}$) in such excess of that amount equivalent to the base present as to establish a hydrogen ion concentration of at least pH 6 but not in such excess of said equivalent as to establish ionizable hydrogen over 0.2% of the weight of cuprous copper in the system, said acid being adapted to form a cuprous salt which is soluble in the mixture.

3. The process of claim 2 wherein the catalyst contains free copper.

4. The process of claim 2 wherein a cuprous salt of the class consisting of cuprous chloride, cuprous bromide, cuprous iodide and cuprous cyanide is present.

5. The process of claim 2 wherein a salt of the group consisting of ammonium chloride, ammonium bromide, and the acetates, formates, hydrochlorides and hydrobromides of pyridine, quinoline, diethylmetanilic acid, dimethylaniline, diethylaniline and quinaldine is present.

6. The process of claim 2 wherein the acid is a member of the group consisting of hydrochloric, hydrobromic, hydroiodic, sulfuric and phosphoric acids.

7. The method of producing from acetylene hydrocarbons of higher molecular weight which comprises bringing the acetylene into contact with an aqueous catalyst at a temperature not in excess of 100° C. and comprising free copper, cuprous chloride, an amount of ammonium chloride or pyridine sufficient to effect substantial saturation of the liquid phase and an amount of HCl sufficient to establish a hydrogen ion concentration of at least pH 6 but insufficient to establish ionizable hydrogen in the mixture in excess of 0.2% of the weight of the cuprous copper.

8. The method of producing from acetylene hydrocarbons of higher molecular weight which comprises bringing the acetylene into contact with an aqueous catalyst mixture prepared from 70 parts of cuprous chloride, 27 parts of ammonium chloride, 7 parts of finely divided copper, 30 parts of water and 2.1 parts of hydrochloric acid (37%), while maintaining the temperature of the reaction at below 50° C.

9. The method of preparing monovinylacetylene which comprises bringing acetylene into contact with an aqueous catalyst at a temperature not in excess of 100° C. and comprising a cuprous salt, a compound of the class consisting of salts of ammonia and tertiary amines and an amount of an inorganic acid (having an ionization constant of at least $10^{-6}$) in such excess of that amount equivalent to the base present as to establish a hydrogen ion concentration of at least pH 6 but not in such excess of said equivalent amount as to establish ionizable hydrogen over 0.2% of the weight of cuprous copper in the system, said acid being adapted to form a cuprous salt which is soluble in the mixture, distilling off the hydrocarbon mixture formed and separating the fraction collected between 0 and 10° C.

10. The method of preparing monovinylacetylene which comprises bringing acetylene into contact with an aqueous catalyst mixture prepared from 70 parts of cuprous chloride, 27 parts of ammonium chloride, 7 parts of finely divided copper, 30 parts of water and 2.1 parts of hydrochloric acid (37%), while maintaining the temperature of the reaction at about 25° C., distilling off the hydrocarbon mixture formed and separating the fraction collected between 0 and 10° C.

11. The process of claim 2 wherein the catalyst is placed in a closed vessel, an excess of acetylene is passed into the mixture, the excess acetylene is separated from the gases emerging from the mixture and is reintroduced with the fresh acetylene.

12. The process of claim 9 wherein a catalyst at a temperature between 45° and 100° C. and comprising cuprous chloride, an amount of ammonium chloride sufficient to effect substantial saturation of the liquid phase and hydrochloric acid is placed in a closed vessel, an excess of acetylene is introduced in a continuous stream, the emerging gases are passed into a condenser to separate the water, reaction products and unreacted acetylene and the separated water and unreacted acetylene are reintroduced into the reaction vessel.

13. The process of claim 9 wherein a catalyst at a temperature of 40° to 60° C. and comprising substantially 1,000 grams of cuprous chloride, substantially 25 cc. of 37% hydrochloric acid, substantially 50 grams of copper powder, substantially 326 grams of ammonium chloride and 450 grams of water is placed in a closed vessel and heated to between 50° and 60° C., acetylene is continuously passed into the heated mixture at such a rate as to cause the reaction of about 9 liters of acetylene per hour, the emerging gases are passed into a condenser to separate the water, reaction products and unreacted acetylene and the separated water and unreacted acetylene are reintroduced into the reaction vessel while maintaining the proportion of hydrochloric acid in the catalyst substantially constant.

14. A catalyst for acetylene reaction prepared from water, a cuprous salt, a compound of the class consisting of salts of ammonia and tertiary amines, and an amount of an inorganic acid (having an ionization constant of at least $10^{-6}$) in such excess of that amount equivalent to the base present as to establish a hydrogen ion concentration of at least pH 6 but not in such excess of said equivalent amount as to establish ionizable hydrogen over 0.2% of the weight of cuprous copper in the system, said acid being adapted to form a cuprous salt which is soluble in the mixture.

15. A catalyst for acetylene reactions prepared from water, free copper, cuprous chloride, an amount of ammonium chloride sufficient to effect substantial saturation of the liquid phase and an amount of HCl sufficient to establish a hydrogen ion concentration of at least pH 6 but insufficient to establish ionizable hydrogen in the mixture in excess of 0.2% of the weight of the cuprous copper.

16. A catalyst for acetylene reactions prepared from 70 parts of cuprous chloride, 27 parts of ammonium chloride, 7 parts of finely divided copper, 30 parts of water and 2.1 parts of hydrochloric acid (37%).

17. A catalyst for acetylene reactions prepared from substantially 1,000 grams of cuprous chloride, substantially 25 cc. of 37% hydrochloric acid, substantially 50 grams of copper powder, substantially 326 grams of ammonium chloride and 450 grams of water.

JULIUS A. NIEUWLAND.